（12）United States Patent
Morati et al.

(10) Patent No.: US 8,912,767 B2
(45) Date of Patent: Dec. 16, 2014

(54) REACTIVE ENERGY COMPENSATOR AND ASSOCIATED METHOD FOR BALANCING HALF-BUS VOLTAGES

(71) Applicant: GE Energy Power Conversion Technology Ltd., Warwickshire (GB)

(72) Inventors: Mathieu Morati, Belfort (FR); Matthieu Urbain, Belfort (FR); Daniel Girod, Cravanche (FR)

(73) Assignee: GE Energy Power Conversion Technology Limited, Rugby, Warwickshire (GB)

( * ) Notice: Subject to any disclaimer, the term of this patent is extended or adjusted under 35 U.S.C. 154(b) by 85 days.

(21) Appl. No.: 13/736,416

(22) Filed: Jan. 8, 2013

(65) Prior Publication Data

US 2013/0176757 A1    Jul. 11, 2013

(30) Foreign Application Priority Data

Jan. 9, 2012   (FR) ...................................... 12 50196

(51) Int. Cl.
*H02M 1/42*      (2007.01)
*H02M 7/537*    (2006.01)
*H02J 3/18*       (2006.01)
*H02M 7/487*    (2007.01)

(52) U.S. Cl.
CPC ............. *H02M 7/537* (2013.01); *H02J 3/1842* (2013.01); *H02J 3/1857* (2013.01); *H02M 7/487* (2013.01); *Y02E 40/22* (2013.01)
USPC ........................................... 323/207; 363/41

(58) Field of Classification Search
CPC .......... G05F 1/70; G05F 3/06; H02M 1/4225; H02M 7/493; H02M 7/49; H02M 3/285; H02M 3/33569
USPC ................. 323/205, 207–209; 363/39–41, 71; 307/105
See application file for complete search history.

(56) References Cited

U.S. PATENT DOCUMENTS 5,329,222 A * 7/1994 Gyugyi et al. ................. 323/207
5,526,252 A * 6/1996 Erdman .......................... 363/41

(Continued)

FOREIGN PATENT DOCUMENTS

FR   2 947 971 A1   1/2011
WO  02/080324 A1  10/2002

OTHER PUBLICATIONS

Akagi, H., "Modern active filters and traditional passive filters", Bull. Polish Academy of Sciences, vol. 54, No. 3, 2006.

(Continued)

*Primary Examiner* — Gary L Laxton
*Assistant Examiner* — Kevin H Sprenger
(74) *Attorney, Agent, or Firm* — Parks IP Law LLC; Theodore A. Wood

(57) ABSTRACT

A reactive energy compensator that can be electrically connected to an AC electrical network, including at least one input direct voltage bus, at least one voltage inverter including switches and first and second capacitors having first and second voltages at their terminals, control means for the switches, including computation means capable of generating a target control current, means for combining the target control current and the output current from the inverter, means for transmitting a control signal capable of driving the switches, and correction means for the control signals of the switches, the correction means being capable of adding a balancing current to the target control current, the balancing current being able to correct the target control current so as to reduce the difference between the values of the first and second voltages, the target control current being increased for an even harmonic of the network frequency.

10 Claims, 5 Drawing Sheets

(56) References Cited

U.S. PATENT DOCUMENTS 6,359,423 B1 * 3/2002 Noro .............................. 323/208
2011/0032735 A1 * 2/2011 Jin et al. ......................... 363/39

OTHER PUBLICATIONS

Rapport de Recherche Préliminaire, Jul. 12, 2012.
Opinion Écrite sur la Brevetabilité de l'Invention, Jul. 12, 2012.

* cited by examiner

REACTIVE ENERGY COMPENSATOR AND ASSOCIATED METHOD FOR BALANCING HALF-BUS VOLTAGES

CROSS REFERENCES TO RELATED APPLICATIONS

This application claims foreign priority benefit of French Patent Application No. 12 50196, entitled COMPENSATEUR D'ÈNERGIE RÈACTIVE ET PROCÈDÈ D'EQUILIBRAGE DE TENSIONS DE DEMI-BUS ASSOCIÈ, filed on Jan. 9, 2012.

FIELD OF THE INVENTION

The field of the present invention is reactive energy compensators.

BACKGROUND OF THE INVENTION

The present invention relates to a reactive energy compensator capable of being electrically connected to an AC electrical network having M phase(s) and having a network frequency, M being greater than or equal to 1, the compensator comprising M phase(s) and including:
at least one input direct voltage bus capable of supplying reactive energy,
at least one voltage inverter connected to the direct voltage bus and capable of converting a direct input current into an alternating output current, the or each inverter comprising two input terminals, M output terminal(s) and M switching branches, each output terminal corresponding to a phase, each switching branch including controllable electronic switches, the or each inverter also comprising a first capacitor having a first voltage at its terminals and a second capacitor having a second voltage at its terminals, the two capacitors being connected serially between the two input terminals of the inverter, and
control means for the electronic switches of the or each inverter, comprising computation means capable of generating a target control current from a current to be compensated, means for combining the target control current and the output current from the inverter to supply a differential current, means for transmitting a control signal capable of driving the switches from the differential current to shape the output current, and correction means, from the first and second voltages, for the control signals of the switches, the correction means being capable of reducing the difference between the value of the first voltage and that of the second voltage.

The invention also relates to a method for balancing half-bus voltages in such a compensator.

Known from the document "Modern active filters and traditional passive filters," by H. Akagi, published in 2006 in the "Bulletin of the Polish Academy of sciences—Technical sciences—Vol. 4—no. 3," is a reactive energy compensator including six inverters. The six inverters are connected to each other in parallel, and connected on the one hand to a capacitor bank, and on the other hand to a three-phase network. The six inverters are connected to each other, on the side of the three-phase network, by means of a transformer having six secondaries. The control signals from the electronic switches of those inverters are pulse width modulation signals.

Such a reactive energy compensator placed in an electrical network makes it possible to offset the circulation of reactive power of a load connected on the electrical network that affects the quality of the electricity delivered on the network.

In such an electrical network, certain disruptions, such as disruptions following the connection of an arc furnace on the network for example, can nevertheless cause an imbalance in the values of the first and second voltages of the or each inverter, that imbalance being able to vary from one inverter to the next. The existence of such an imbalance deteriorates the performance of the reactive energy compensator and may lead to the deactivation thereof if the value of the imbalance exceeds a certain threshold.

Known then from document FR 2,947,971 is a conversion device capable of being used in a power supply system for an electrical machine. Such a conversion device includes means for correcting the control signals of the switches of the or each inverter, the means being able to reduce, for the or each inverter, the difference between the value of the first voltage and that of the second voltage. This correction of the control signals is done using specific control algorithms for the switches.

Nevertheless, such a conversion device cannot be used as is in a reactive energy compensator of the aforementioned type to resolve the problem of rebalancing the values of the first and second voltages of the or each inverter. In fact, the transient states due to the electrical disruptions are stronger in a reactive energy compensator than a power supply system, and that solution is not satisfactory in particular in terms of the speed of correction used.

SUMMARY OF THE DESCRIPTION

The aim of the invention is to propose a reactive energy compensator making it possible to increase the balancing speed between the values of the first and second voltages of the or each inverter.

To that end, the invention relates to a reactive energy compensator of the aforementioned type, wherein the correction means are able to add a balancing current to the target control current, the balancing current being able to correct the target control current so as to reduce the difference between the values of the first and second voltages, the target control current being increased for an even harmonic of the network frequency.

According to other embodiments, the reactive energy compensator comprises one or more of the following features, considered alone or according to all technically possible combinations:
the correction means can determine a value of the balancing current, the balancing current being a periodic frequency signal equal to a non-zero even multiple of the network frequency;
the balancing current is a sinusoidal frequency signal equal to a non-zero even multiple of the network frequency;
the amplitude of the balancing current is proportional to the difference between the current value of the first voltage and the current value of the second voltage;
each electronic switch is a two-way switch, and comprises a transistor and a diode connected in anti-parallel;
the transistor is an insulated gate bipolar transistor;
the balancing current is a periodic frequency signal equal to twice the network frequency.

The invention also relates to a method for balancing half-bus voltages in a reactive energy compensator of the aforementioned type, including the following steps:
calculating control signals for the electronic switches of the or each inverter of the reactive energy compensator, correcting the control signals, so as to reduce the difference between the value of the first voltage and that of the second voltage, and applying modified control signals to said electronic switches, the step for correcting the control signals comprising a step for adding, using the correction means of the compensator, a balancing current to the target control current, the balancing current being able to correct the target control current in order to reduce the difference between the values of the first and second voltages, the target control current being increased for an even harmonic of the network frequency.

According to other embodiments, the balancing method comprises one or more of the following features, considered alone or according to all technically possible combinations:

the step for correcting the control signals comprises a prior step for determining, using the correction means of the compensator, a value of the balancing current, the balancing current being a periodic frequency signal equal to a non-zero even multiple of the network frequency;

during the step for determining a value of the balancing current, the amplitude of the balancing current is considered to be proportional to the difference between the current value of the first voltage and the current value of the second voltage.

BRIEF DESCRIPTION OF THE DRAWINGS

These features and advantages of the invention will appear upon reading the following description, provided solely as an example, and done in reference to the appended drawings, in which.

DETAILED DESCRIPTION

Figure 1:
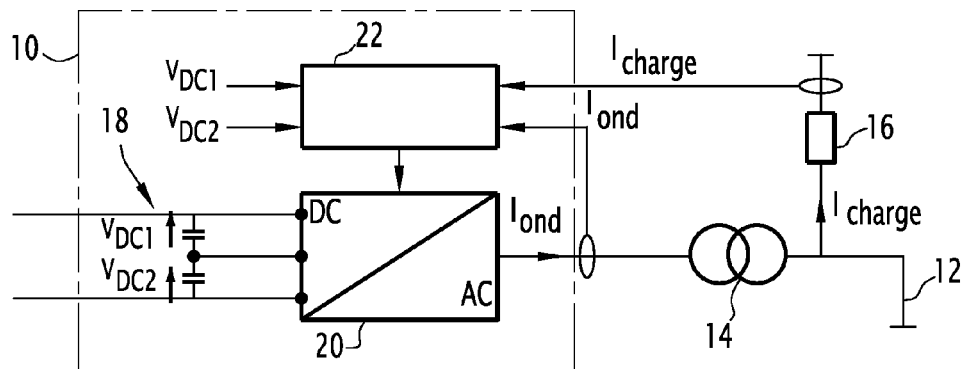
FIG. 1 is a diagrammatic view of a reactive energy compensator according to the invention, the compensator being connected by means of a voltage transformer to an AC network, to which an arc furnace is also connected.

FIG. 1 shows a system 10 for converting a direct input current into a polyphase alternating output current. The conversion system 10 is connected on the one hand to a direct or rectified current source, not shown, and on the other hand to an electrical network 12, by means of a voltage transformer 14.

The electrical network 12 is, for example, a high-voltage three-phase alternating network, typically in the vicinity of 33 kV between phases and with a frequency f1 for example equal to 50 Hz. An arc furnace 16 is also connected to the electrical network 12.

The conversion system 10 includes a direct voltage bus 18 and a voltage inverter 20, capable of converting a direct input current into a polyphase alternating output current. This inverter is connected to the direct or rectified current source by means of the direct voltage bus 18.

The current $I_{ond}$ shown in FIG. 1 identifies an alternating current supplied as output from the inverter 20 for any phase.

The conversion system 10 also includes control means 22 for the inverter 20, suitable for controlling the inverter so as to drive the output current delivered by the inverter 20 for each phase.

The direct voltage bus 18 supplies a voltage for example with a value equal to 5 kV.

In the considered embodiment, the conversion system 10 is a reactive energy compensator capable of compensating the reactive energy variations on the alternating network 12, by means of the direct current source and the direct voltage bus 18, able to supply reactive energy, by adjusting the phases of the electrical current relative to those of the electrical voltage, delivered on the network.

Figure 2:
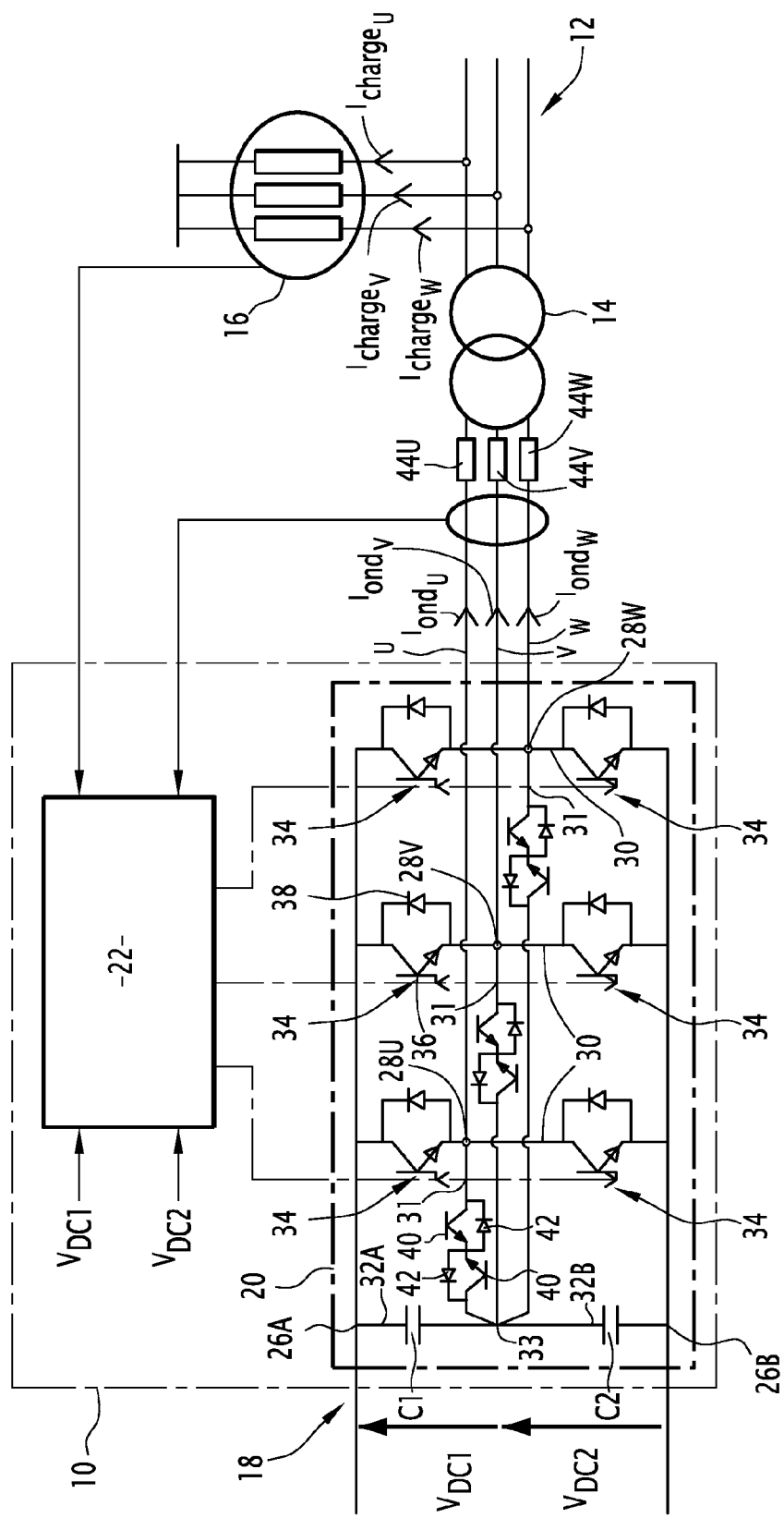
FIG. 2 is electrical diagram of the reactive energy compensator of FIG. 1 according to one example embodiment, including a three-phase voltage inverter and control means for the electronic switches of the inverter, the inverter including two capacitors serially connected.

The voltage inverter 20 includes a positive input terminal, a negative input terminal, and M output terminals. Each output terminal corresponds to a respective phase of the polyphase output alternating current capable of being delivered by the inverter. The output current includes a plurality M of phases, M being an integer greater than or equal to one. In the example embodiment of FIG. 2, the number M of phases is equal to three and the voltage inverter 20 is a neutral point clamped three-level three-phase inverter. The three-phase inverter 20 comprises a positive input terminal 26A, a negative input terminal 26B and three output terminals 28U, 28V, 28W. The inverter 20 also comprises, for each output terminal 28U, 28V, 28W corresponding to the respective phase U, V, W, a switching branch 30 connected between the two input terminals 26A, 26B and a clamping branch 31 connecting the neutral to a middle point of the associated switching branch. The three-phase inverter 20 also comprises a first branch 32A and a second branch 32B. The two branches 32A, 32B are connected serially between the two input terminals 26A, 26B, and are connected to each other at a middle point 33 forming the neutral.

The branch 32A, 32B, respectively, includes a first capacitor C1 and a second capacitor C2, respectively, and forms a direct voltage bus.

The first capacitor C1 has a first direct voltage $V_{DC1}$ at its terminals, and the second capacitor C2 has a second direct voltage $V_{DC2}$ at its terminals. The first direct voltage $V_{DC1}$ and the second direct voltage $V_{DC2}$ are oriented in the same direction. The values of the capacities of the two capacitors C1, C2 are for example identical.

Alternatively, each capacitor C1, C2 is replaced by a direct voltage source.

Each switching branch 30 comprises two controllable electrical switches 34 connected serially in the same direction, and connected to each other by a middle point, each middle point forming an output terminal 28U, 28V, 28W.

As known in itself, each electrical switch 34 is a two-way current and one-way voltage switch. Each electrical switch 34 comprises a transistor 36 and a diode 38 connected in anti-parallel, thereby ensuring two-way circulation paths when the transistor 36 is on.

All of the electrical switches 34 are for example identical. The transistor 36 is, for example, an insulated gate bipolar transistor (IGBT). The gate of each transistor 36 is connected to the control means 22 to receive a corresponding control signal.

Each clamping branch 31 is connected between the middle point 33 and an output terminal 28U, 28V, 28W. Each clamping branch 31 includes two transistors 40 connected head to tail and serially. It also includes two diodes 42, each being connected in anti-parallel with a respective transistor 40, thereby ensuring two-way current circulation paths when the corresponding transistor 40 is on.

The transistors 40 are for example IGBT transistors.

Between the reactive energy compensator 10 and the transformer 14, a phase inductance 44U, 44V, 44W, respectively, is positioned on the phase U, V, W, respectively.

The arc furnace 16 consumes a current $I_{charge\ U}$, $I_{charge\ V}$, $I_{charge\ W}$, respectively, on the phase U, V, W, respectively.

The inverter 20 supplies a current $I_{ond\ U}$, $I_{ond\ V}$, $I_{ond\ W}$, respectively, on the phase U, V, W, respectively.

In the considered embodiment, the control means 22 are adapted to drive and control the compensation of the reactive power circulation on the network 12 and to thereby increase the power factor of the network.

The control means 22 are connected to each of the electrical switches 34, as previously indicated, and can send control signals to said switches 34. The control means 22 are also connected to devices for measuring the currents $I_{charge\ U}$, $I_{charge\ V}$, $I_{charge\ W}$, $I_{ond\ U}$, $I_{ond\ V}$, $I_{ond\ W}$, and to devices for measuring voltages $V_{DC1}$ and $V_{DC2}$, said devices not being shown in the figures.

Hereafter, $I_{charge}$ refers to the three-dimensional current vector representing the current in the load 16. $I_{charge}$ includes three measured current components, each component corresponding to a phase U, V, W.

The device for measuring the currents $I_{ond\ U}$, $I_{ond\ V}$, $I_{ond\ W}$ includes a module for converting those three-phase currents into a two-dimensional current vector $I_{ond}$, which is representative of those currents in a two-phase system.

Figure 3:
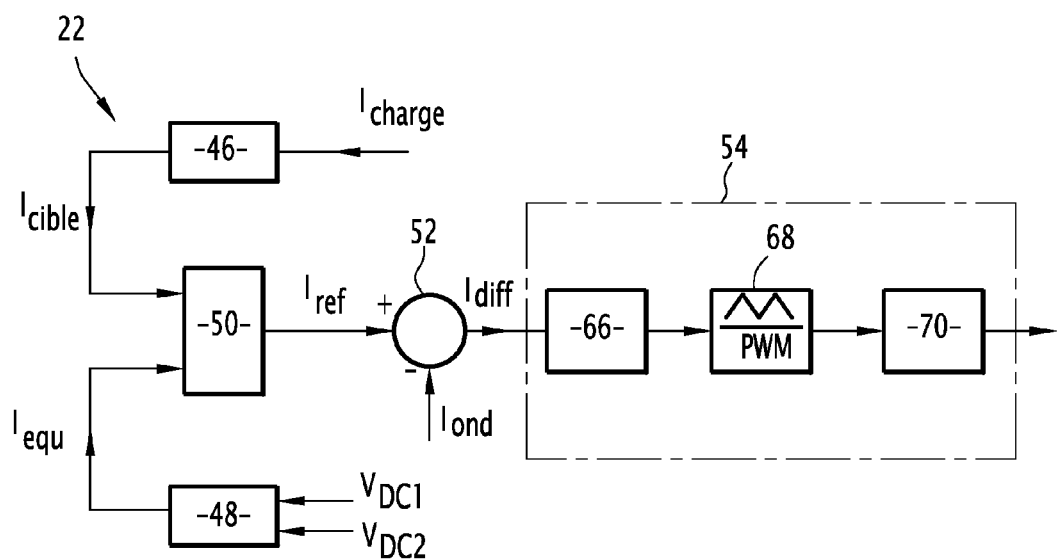
FIG. 3 is a block diagram of the control means of FIG. 2, comprising a member for correcting the control signals.

As illustrated in FIG. 3, the control means 22 comprises a member 46 for calculating a control current and a member 48 for correcting a control current. The control means 22 also comprise an adder 50, a subtracter 52 and means 54 for transmitting a control signal.

In the example embodiment, the computation member 46 is a reactive power compensation block.

The reactive power compensation block 46 is connected to the adder 50. It receives as input the measured components of the current vector $I_{charge}$ consumed by the arc furnace 16 and is capable of implementing an algorithm known in itself for determining a target value of a current vector $I_{cible}$ as output from the inverter 20. The block 46 includes a module for converting a three-dimensional current vector into a two-dimensional current vector, such a module being known in itself. The current vector $I_{cible}$, defined in a two-phase system, includes two target current components, and makes it possible to compensate the reactive power of the arc furnace 16.

The reactive power compensation block 46 is thus able to calculate and provide, as input for the adder 50, the target current control vector $I_{cible}$.

The correction member 48 is connected to the adder 50. It receives, as input, the current values of the voltages $V_{DC1}$ and $V_{DC2}$ and is able to carry out an algorithm for determining a value of a current balancing factor $I_{equ}$. The current balancing vector $I_{equ}$, defined in a two-phase system, makes it possible to correct the current vector $I_{cible}$ so as to reduce the difference between the current value of the first voltage $V_{DC1}$ and the current value of the second voltage $V_{DC2}$. The current balancing vector $I_{equ}$ includes a first balancing current component $I_a$ and a second balancing current component $I_b$.

Figure 4:
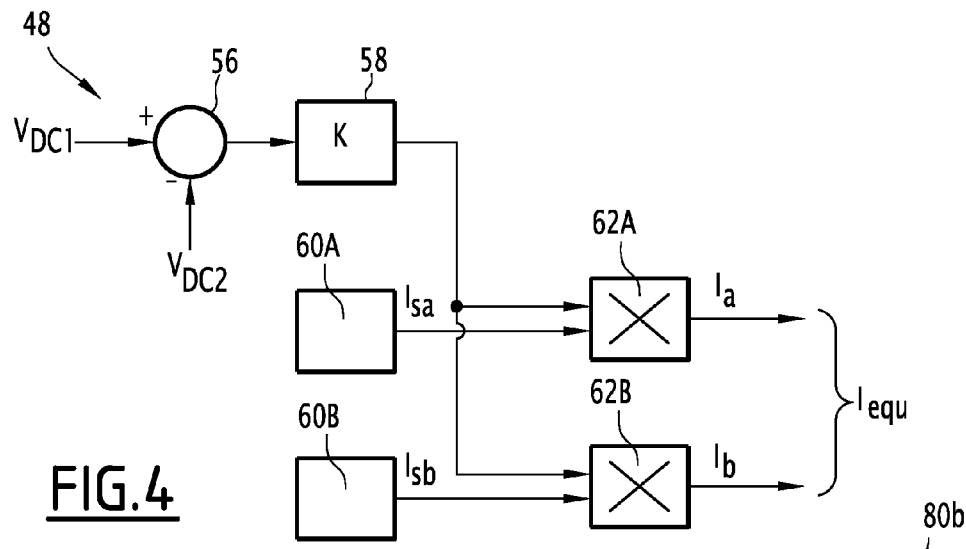
FIG. 4 is a block diagram of the member for correcting the control signals of FIG. 3.

As illustrated in FIG. 4, the correction member 48 includes a subtracter 56, an amplifier 58 connected as output to the subtracter 56, a first alternating current source 60A and a second alternating current source 60B. The correction member 48 also includes a first multiplier 62A and a second multiplier 62B.

The subtracter 56 receives, on its non-inverting input, the current value of the voltage $V_{DC1}$ and, on its inverting input, the current value of the voltage $V_{DC2}$.

The output of the amplifier 58 is connected to an input of each multiplier 62A, 62B. The amplifier 58 is capable of multiplying the input signal by a gain K, K being a real number.

The alternating current source 60A, 60B, respectively, is connected to an input of the multiplier 62A, 62B, respectively.

The alternating current source 60A provides a sinusoidal current $I_{sa}$ as input for the first multiplier 62A. The current $I_{sa}(t)$ may be expressed as follows:

$$Isa(t)=\sin(2\pi.2f1.t).$$

In the example embodiment, f1=50 Hz and $$Isa(t)=\sin(200\pi.t).$$

The alternating current source 60B provides a sinusoidal current $I_{sb}$ as input for the second multiplier 62B. The current $I_{sb}(t)$ may be expressed as follows:

$$Isb(t)=\cos(2\pi.2f1.t).$$

In the example embodiment, f1=50 Hz and $$Isb(t)=\cos(200\pi.t).$$

The alternating current source 60A, 60B thus generates a sinusoidal current $I_{sa}(t)$, $I_{sb}(t)$, respectively, with a frequency equal to twice the network frequency.

The first multiplier 62A provides the balancing current component Ia as its output. The balancing current component $I_a(t)$ may be expressed as follows:

$$Ia(t)=K.[Vdc1(t)-Vdc2(t)]*\sin(2\pi.2f1.t). \qquad (1)$$

The second multiplier 62B provides the balancing current component $I_b$ as its output. The balancing current component Ib(t) may be expressed as follows:

$$Ib(t)=K.[Vdc1(t)-Vdc2(t)]*\cos(2\pi.2f1.t). \qquad (2)$$

In the example embodiment, f1=50 Hz. One therefore has:

$$Ia(t)=K.[Vdc1(t)-Vdc2(t)]*\sin(200\pi.t)$$

and $$Ib(t)=K.[Vdc1(t)-Vdc2(t)]*\cos(200\pi.t).$$

The correction member 48 is thus capable of calculating and supplying the current balancing vector $I_{equ}$ as input for the adder 50. Each component $I_a$, $I_b$ of the current balancing vector $I_{equ}$ is a sinusoidal current with a frequency equal to twice the network frequency, and an amplitude proportional to the difference between the current value of the first voltage $V_{DC1}$ and the current value of the second voltage $V_{DC2}$.

Alternatively, the alternating current source 60A, 60B, respectively, generates a sinusoidal current $I_{sa}(t)$, $I_{sb}(t)$, respectively, with a frequency equal to N times the network frequency f1, N being a non-zero even integer. The correction member 48 is then capable of calculating and supplying the current balancing vector $I_{equ}$ as input for the adder 50, each component $I_a$, $I_b$ of the current balancing vector $I_{equ}$ being a sinusoidal current with frequency equal to N times the network frequency. According to this alternative embodiment, the components $I_a(t)$ and $I_b(t)$ may be expressed as follows:

$$Ia(t)=K.[Vdc1(t)-Vdc2(t)]*\sin(2\pi.N.f1t)$$

$$Ib(t)=K.[Vdc1(t)-Vdc2(t)]*\cos(2\pi.N.f1t).$$

Alternatively, the alternating current source 60A, 60B, respectively, generates a periodic current, with a frequency equal to N times the network frequency f1, N being a non-zero even integer. The correction member 48 is then capable of calculating and supplying the balancing current $I_{equ}$ as input for the adder 50, each component $I_a$, $I_b$ of the balancing current vector $I_{equ}$ being a periodic frequency current equal to N times the network frequency.

The output from the adder 50 is connected to an input of the subtracter 52. The adder 50 receives the target control current vector $I_{cible}$ on one input and the balancing current vector $I_{equ}$ on the other input. It provides a reference target current vector $I_{ref}$ on its output.

This current vector $I_{ref}$ is the target current vector to be supplied by the inverter 20, allowing compensation of the reactive load on the one hand and production of the difference between the current values of the voltages $V_{DC1}$ and $V_{DC2}$ on the other hand.

The output of the subtracter 52 is connected to the input of the means 54 for transmitting a control signal. The subtracter 52 receives the reference target current vector $I_{ref}$ on its non-inverting input and the current vector $I_{ond}$ on its inverting input. It provides a differential current vector $I_{diff}$ as its output. The current vector $I_{diff}$ is defined in a two-phase system.

As illustrated in FIG. 3 and as known in itself, the means 54 for transmitting a control signal include a current regulator 66, a modulator 68 connected as output to the regulator 66, and a control module 70 connected as output to the modulator 68.

The regulator 66 receives the differential current vector $I_{diff}$ as input and is capable of calculating modulating voltage signals for each phase U, V, W as a function of the current vector $I_{diff}$. The regulator 66 includes a module for converting a two-dimensional current vector into a three-dimensional current vector, such a module being known in itself.

In the example embodiment, the regulator 66 is of the PI (Proportional Integral) type, this type of regulator being used traditionally in the regulation of loop systems.

Alternatively, the regulator 66 is of the RST type.

The modulating voltage signals are supplied as input for the modulator 68 adapted to proceed with a pulse width modulation with the corresponding pulse and phase shift interlacing. The modulator 68 is for example adapted to compare an input modulating voltage to a triangular signal, as is known in itself.

The results of this comparison are provided as input for the control module 70. The control module 70 is capable of determining control signals designed for the switches 34 as a function of said results, and applying those control signals to the switches 34.

Alternatively, the reactive energy compensator 10 includes a plurality P of inverters 20, P being an integer greater than or equal to two. Each inverter 20 delivers a polyphase alternating current and is connected by its M output terminals 28 to the voltage transformer 14. The control means 22 of each inverter include a correction member 48 capable of adding a balancing current vector $I_{equ}$ to the target control current vector $I_{cible}$. The reactive energy compensator 10 therefore has P correction members.

Figure 5:
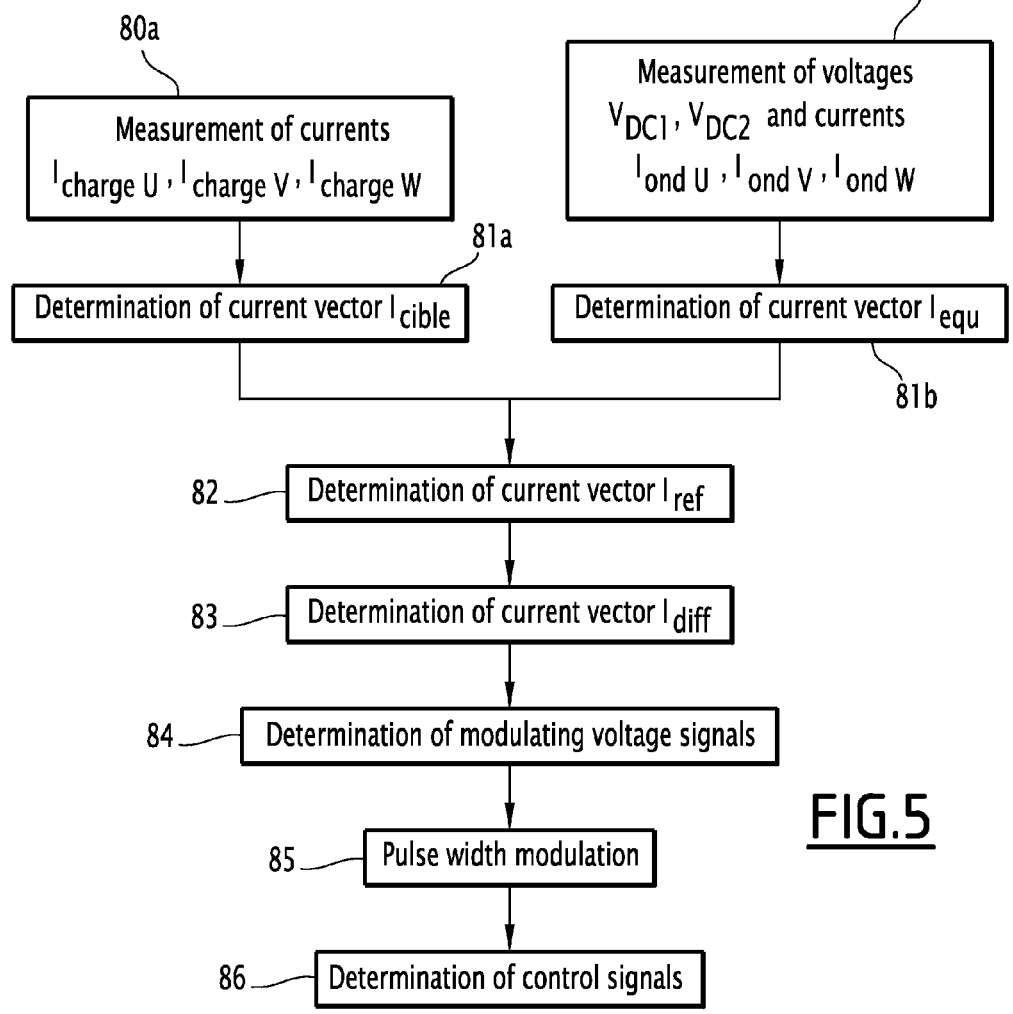
FIG. 5 is a flowchart showing a method for balancing half-bus voltages in a reactive energy compensator according to the invention.

FIG. 5 shows the steps of a method in one embodiment of the invention, implemented by the reactive energy compensator 10.

The method includes an initial step 80a, in which the currents $I_{charge\ U}$, $I_{charge\ V}$, $I_{charge\ W}$ circulating in the arc furnace 16 are measured.

During a following step 81a, the reactive power compensation block 46 determines a target control current vector $I_{cible}$ to be supplied by the inverter 20, as a function of the measured currents $I_{charge\ U}$, $I_{charge\ V}$, $I_{charge\ W}$.

In parallel with steps 80a, 81a, during a step 80b, the current values of the voltages $V_{DC1}$ and $V_{DC2}$ are measured. During that same step 80b, the currents $I_{ond\ U}$, $I_{ond\ V}$, $I_{ond\ W}$ circulating as output from the inverter 20 are measured, and the current vector $I_{ond}$ is built.

In parallel with steps 80a, 81a, during a step 81b following step 80b, the correction member 48 determines the balancing current vector $I_{equ}$, including the balancing current components $I_a$ and $I_b$. The expression of the current component $I_a$ is given by formula (1) outlined above, the expression of the current component $I_b$ being given by formula (2).

During a following step 82, the adder 50 adds the target current vector $I_{cible}$ and the balancing current vector $I_{equ}$, the result of that some determining the target current vector $I_{ref}$.

During a following step 83, the subtracter 52 subtracts the components of the current vector $I_{ond}$ from the components of the target current vector $I_{ref}$, the result of that subtraction determining the differential current vector $I_{diff}$.

During a following step 84, the regulator 66 determines modulating voltage signals for each phase U, V, W, as a function of the differential current vector $I_{diff}$, as previously described.

During a following step 85, the modulator 68 performs a pulse width modulation with corresponding pulse and phase shift interlacing, as a function of the modulating voltage signals. The modulator 68 for example compares an input modulating voltage to a triangular signal, as is known in itself.

During a following step 86, the control module 70 determines control signals intended for the switches 34 as a function of the modulation signals. The control module 70 applies those control signals to the switches 34.

Figure 6:
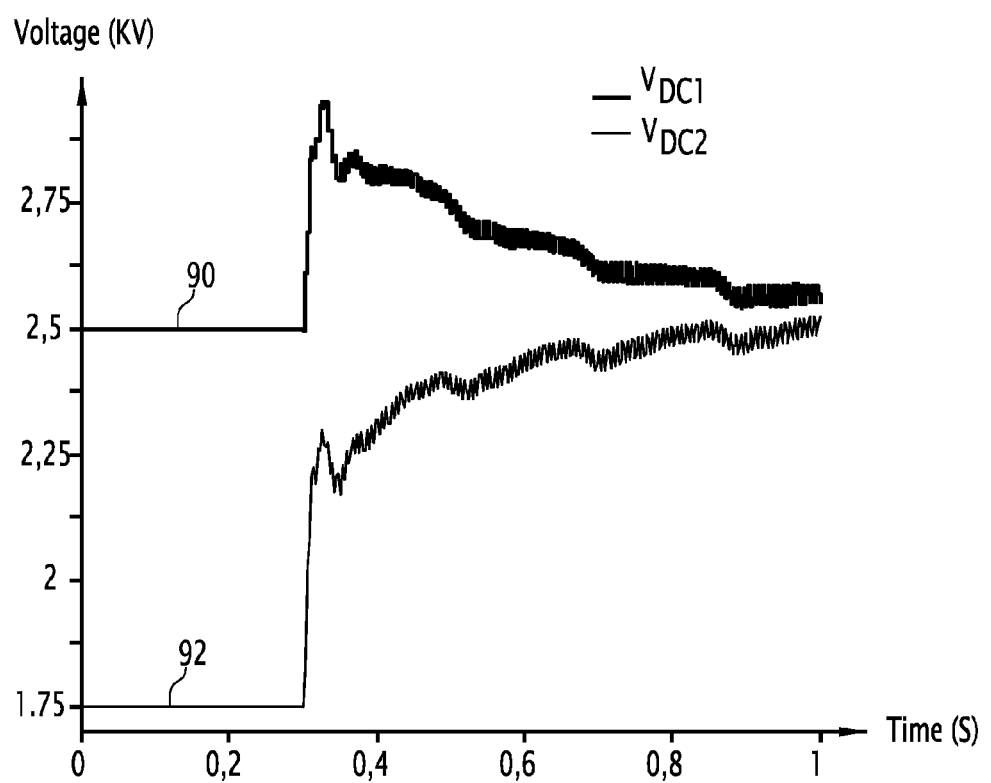
FIG. 6 is a set of curves showing, as a function of time, the respective values of the voltages of the terminals of each of the capacitors of a reactive energy compensator of the prior art.

In FIG. 6, the curves 90, 92 respectively show the evolution of the voltages $V_{DC1}$, $V_{DC2}$, for a reactive energy compensator of the prior art, similar to the compensator 10 according to the invention but not including a member 48 capable of providing a balancing current $I_{equ}$. This reactive energy compensator nevertheless includes two balancing resistances, each resistance being connected in parallel with a capacitor C1, C2 and having a value of 10 kΩ. These two resistances are capable of reducing the difference between the value of the first voltage $V_{DC1}$ and that of the second voltage $V_{DC2}$.

At moment 0 s, a disruption following the connection of the arc furnace on the network appears. The voltages $V_{DC1}$, $V_{DC2}$ are then unbalanced: the first voltage $V_{DC1}$ is equal to 2.5 kV while the second voltage $V_{DC2}$ is equal to 1.75 kV. At moment 0.3 s, the control means for the inverter command the switch of the electronic switches. Due to the presence of the two balancing resistances, the values of the voltages $V_{DC1}$, $V_{DC2}$ converge toward one another, to come together substantially at moment 1 s.

Figure 7:
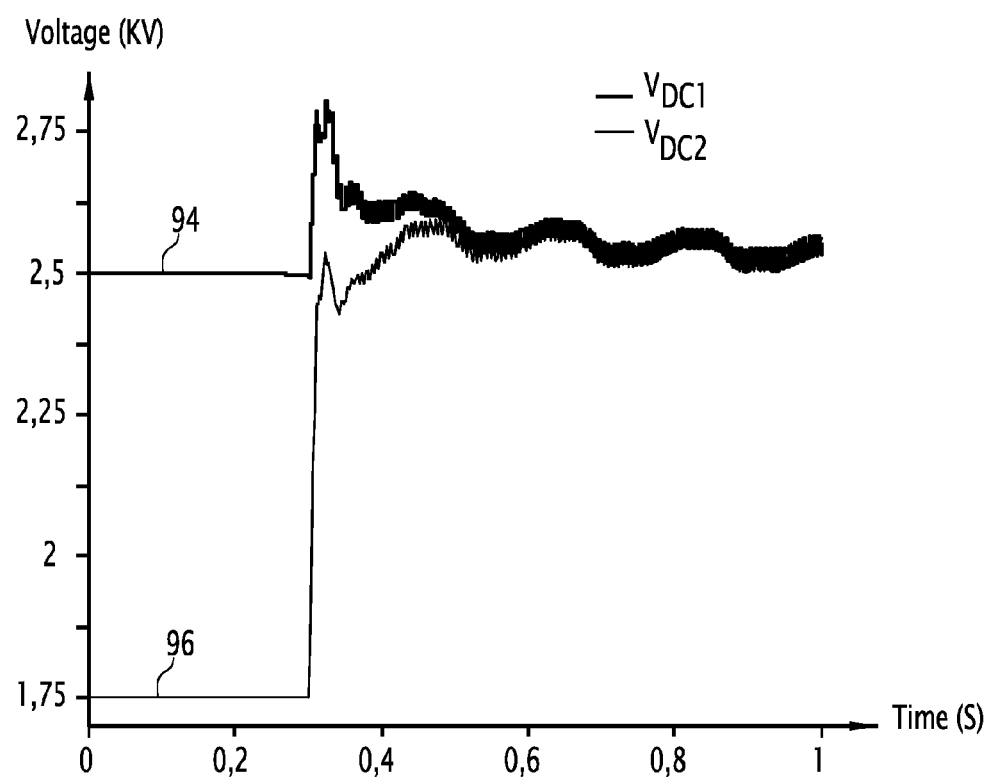
FIG. 7 is a set of curves showing, as a function of time, the respective values of the voltages at the terminals of each of the capacitors of the reactive energy compensator of FIG. 2.

In FIG. 7, the curves 94, 96 respectively show the evolution of the voltages $V_{DC1}$, $V_{DC2}$, for the reactive energy compensator 10. More specifically, the curves 94, 96 show the evolution of the voltages $V_{DC1}$, $V_{DC2}$, during steps 80a to 86 described above.

Similarly to FIG. 6, a disruption appears at moment 0 s, and the voltages $V_{DC1}$, $V_{DC2}$ are unbalanced between moments 0 s and 0.3 s. Between these two moments, the first voltage $V_{DC1}$ is equal to 2.5 kV and the second voltage $V_{DC2}$ is equal to 1.75 kV. At moment 0.3 s, corresponding to the beginning of step 86, the control means 22 order switching of the switches 34. The values of the voltages $V_{DC1}$, $V_{DC2}$ converge toward one another, and combine at moment 0.6 s.

One can see that the reactive energy compensator according to the invention makes it possible to increase the balancing speed between the values of the first and second voltages of the or each inverter.

In the presented example embodiment, the target control current is increased by a balancing current for a rank two harmonic. This choice of design advantageously makes it possible for the balancing method not to be limited by the sampling frequency of the control means.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A reactive energy compensator capable of being electrically connected to an AC electrical network having M phase(s) and having a network frequency, M being greater than or equal to 1, the compensator comprising M phase(s) and including:
    at least one input direct voltage bus capable of supplying reactive energy;
    at least one voltage inverter connected to the direct voltage bus and capable of converting a direct input current into an alternating output current, the or each inverter comprising two input terminals, M output terminal(s) and M switching branches, each output terminal corresponding to a phase, each switching branch including controllable electronic switches, the or each inverter also comprising a first capacitor having a first voltage at its terminals and a second capacitor having a second voltage at its terminals, the two capacitors being connected serially between the two input terminals of the inverter; and
    control means for the electronic switches of the or each inverter, comprising computation means capable of generating a target control current from a current to be compensated, means for combining the target control current and the output current from the inverter to supply a differential current, means for transmitting a control signal capable of driving the switches from the differential current to shape the output current, and correction means, from the first and second voltages, for the control signals of the switches, the correction means being capable of reducing the difference between the value of the first voltage and that of the second voltage,
wherein the correction means are able to add a balancing current to the target control current, the balancing current being able to correct the target control current so as to reduce the difference between the values of the first and second voltages, the target control current being increased for an even harmonic of the network frequency.

2. The reactive energy compensator according to claim 1, wherein the correction means can determine a value of the balancing current, the balancing current being a periodic frequency signal equal to a non-zero even multiple of the network frequency.

3. The reactive energy compensator according to claim 2, wherein the balancing current is a sinusoidal frequency signal equal to a non-zero even multiple of the network frequency.

4. The reactive energy compensator according to claim 2, wherein the amplitude of the balancing current is proportional to the difference between the current value of the first voltage and the current value of the second voltage.

5. The reactive energy compensator according to claim 1, wherein each electronic switch is a two-way switch, and comprises a transistor and a diode connected in anti-parallel.

6. The reactive energy compensator according to claim 5, wherein the transistor is an insulated gate bipolar transistor.

7. The reactive energy compensator according to claim 1, wherein the balancing current is a periodic frequency signal equal to twice the network frequency.

8. A method for balancing half-bus voltages in a reactive energy compensator according to any one of the preceding claims, including the following steps:
    calculating control signals for the electronic switches of the or each inverter of the reactive energy compensator;
    correcting the control signals, so as to reduce the difference between the value of the first voltage and that of the second voltage; and
    applying modified control signals to said electronic switches,
wherein the step for correcting the control signals comprises a step for adding, using the correction means of the compensator, a balancing current to the target control current, the balancing current being able to correct the target control current in order to reduce the difference between the values of the first and second voltages, the target control current being increased for an even harmonic of the network frequency.

9. The method according to claim 8, wherein the step for correcting the control signals comprises a prior step for determining, using the correction means of the compensator, a value of the balancing current, the balancing current being a periodic frequency signal equal to a non-zero even multiple of the network frequency.

10. The method according to claim 9, wherein during the step for determining a value of the balancing current, the amplitude of the balancing current is considered to be proportional to the difference between the current value of the first voltage and the current value of the second voltage.

* * * * *